(12) United States Patent
Cheong et al.

(10) Patent No.: US 7,640,000 B2
(45) Date of Patent: Dec. 29, 2009

(54) APPARATUS AND METHOD FOR CANCELLATION OF PARTIALLY OVERLAPPED CROSSTALK SIGNALS

(75) Inventors: Min-Ho Cheong, Daejeon (KR); Hyeong-Jun Park, Daejeon (KR); Yong-Hwan Lee, Seoul (KR)

(73) Assignee: Electronics and Telecommunications Research Institute, Daejon (KR)

( * ) Notice: Subject to any disclaimer, the term of this patent is extended or adjusted under 35 U.S.C. 154(b) by 617 days.

(21) Appl. No.: 11/604,898

(22) Filed: Nov. 28, 2006

(65) Prior Publication Data

US 2007/0133815 A1    Jun. 14, 2007

(30) Foreign Application Priority Data

Dec. 10, 2005   (KR) ...................... 10-2005-0121380
Nov. 24, 2006   (KR) ...................... 10-2006-0116951

(51) Int. Cl.
*H04B 1/10* (2006.01)
*H03D 1/04* (2006.01)

(52) U.S. Cl. ................... 455/295; 455/296; 455/67.11; 455/226.1; 375/346; 375/324; 375/349; 381/71.1

(58) Field of Classification Search ......... 455/295–296, 455/226.1–226.4, 67.11–67.14, 307; 375/324, 375/326, 346, 349; 381/71.1, 17
See application file for complete search history.

(56) References Cited

U.S. PATENT DOCUMENTS

| | | | | |
|---|---|---|---|---|
| 4,754,481 A | * | 6/1988 | Feggeler | 380/41 |
| 5,257,312 A | * | 10/1993 | Therssen et al. | 381/71.1 |
| 5,535,133 A | * | 7/1996 | Petschauer et al. | 455/296 |
| 5,878,088 A | * | 3/1999 | Knutson et al. | 375/324 |

(Continued)

FOREIGN PATENT DOCUMENTS

JP    11/055548    2/1999

(Continued)

OTHER PUBLICATIONS

Minho Cheong et al.; "Computationally Efficient Cancellation of Partially-overlapped Crosstalk in Digital Subscriber Lines"; IEEE GLOBECOM 2005 proceeding; St. Lousi, Missouri, USA; Nov. 28-Dec. 2, 2005.

*Primary Examiner*—Lana N Le
(74) *Attorney, Agent, or Firm*—Lowe Hauptman Ham & Berner LLP

(57) ABSTRACT

The present invention is related to a partially overlapped single-carrier crosstalk signal cancellation method and an apparatus using the same. For this purpose, the present invention provides a crosstalk canceller including a pre-processor for frequency down-shifting an input signal, a crosstalk signal cancellation module for canceling the crosstalk signal by dividing the input signal by an interpolation ratio, a post-processor for converting an output of the crosstalk signal cancellation modulation into a passband signal, and an error feedback processor for performing a decimation operation on a residual crosstalk signal and feeding backing the decimated residual crosstalk signal to the crosstalk signal cancellation module. In addition, the present invention provides a crosstalk signal cancellation method for performing interpolation and filtering operations by frequency down-shifting an input signal including a crosstalk signal to a baseband and decimating a residual crosstalk signal by frequency-shifting to an original signal frequency.

14 Claims, 6 Drawing Sheets

U.S. PATENT DOCUMENTS

| | | | |
|---|---|---|---|
| 5,919,134 A * | 7/1999 | Diab | 600/323 |
| 5,956,372 A * | 9/1999 | Vaman et al. | 375/346 |
| 6,026,169 A * | 2/2000 | Fujimori | 381/71.1 |
| 6,075,408 A * | 6/2000 | Kullstam et al. | 375/324 |
| 6,313,703 B1 * | 11/2001 | Wright et al. | 330/149 |
| 6,452,981 B1 * | 9/2002 | Raleigh et al. | 375/349 |
| 6,687,288 B1 | 2/2004 | Shteiman | |
| 6,762,714 B2 * | 7/2004 | Cohen et al. | 375/325 |
| 6,934,387 B1 | 8/2005 | Kim | |
| 6,982,937 B2 * | 1/2006 | Kanaoka et al. | 455/295 |
| 7,092,457 B1 * | 8/2006 | Chugg et al. | 375/324 |
| 7,142,606 B2 * | 11/2006 | Talwalkar et al. | 375/346 |
| 7,218,581 B2 | 5/2007 | Frisson et al. | |
| 7,558,349 B2 * | 7/2009 | Kite | 375/346 |
| 2001/0035912 A1 * | 11/2001 | Cooper et al. | 455/226.1 |
| 2003/0039310 A1 | 2/2003 | Wu et al. | |
| 2007/0269061 A1 * | 11/2007 | Kim et al. | 381/303 |
| 2009/0116582 A1 * | 5/2009 | Ashikhmin et al. | 375/296 |

FOREIGN PATENT DOCUMENTS

| | | |
|---|---|---|
| KR | 101999009555 | 2/1999 |
| KR | 10-2005-0088456 | 9/2005 |
| WO | 2005/006619 | 1/2005 |

\* cited by examiner

APPARATUS AND METHOD FOR CANCELLATION OF PARTIALLY OVERLAPPED CROSSTALK SIGNALS

BACKGROUND OF THE INVENTION (a) Field of the Invention

The present invention relates to a method for canceling a partially overlapped single-carrier crosstalk signal and an apparatus using the same. More particularly, the present invention relates to an apparatus for cancellation of a partially overlapped crosstalk signal generated due to overlapping of a transmit frequency bandwidth of a transmitting apparatus and a receive frequency bandwidth of a receiving apparatus in a mobile communication environment for data transmission, and a method thereof.

(b) Description of the Related Art

The development of communication and network technologies has provided various types of multimedia services such as e-mail, chatting, messengers, games, movies, and music. Particularly, many users require multimedia services through a wireless Internet service since the users can use the wireless Internet service anytime and anywhere.

An increasing demand for the multimedia services requires a higher data transmission speed for multimedia service contents transmission, and the higher data transmission speed can be achieved by increasing spectral efficiency, a data symbol transmission rate, or a signal bandwidth.

However, increase of the symbol rate may not always be feasible in practice due to the limited available bandwidth and complexity in implementation of a mobile communication system. For this reason, the demand for the high speed transmission cannot be solved by simply increasing the data transmission speed.

In a digital subscriber line (DSL) environment, different frequency bands are used for a transmitter (TX) and a receiver (Rx) for duplex operation. For example, the increase of the symbol rate can be achieved without increasing the overall bandwidth by making the Tx and Rx spectra overlap each other in the frequency domain. In this case, a crosstalk signal due to imperfect wire shielding must be suppressed.

Conventionally, an inband data-driven crosstalk canceller (IDXC) scheme is used to cancel the crosstalk signal.

The IDXC scheme processes the crosstalk signal at a Nyquist rate, which can be implemented by using a polyphase structure, and therefore, the IDXC scheme provides reliable performance while being robust against timing and frequency offset. Herein, the Nyquist rate can be used to perform signal transmission without causing inter-symbol interference.

However, when an overlapped bandwidth of the crosstalk signal is smaller than a bandwidth of a Tx signal, a conventional Nyquist rate IDXC uses a sampling frequency much higher than the bandwidth of the overlapped crosstalk, requiring large computational complexity.

FIG. 1 shows that the spectrum of a single-carrier crosstalk signal is formed by the partially overlapped spectra of the Tx and Rx signals.

As shown in FIG. 1, assuming that the Tx and Rx spectra are partially overlapped, a spectrum $f_e$ of a crosstalk signal can be represented as given in Equation 1.

$$f_e = f_{C_L} + \frac{f_{b_L}}{f_{b_L} + f_{b_H}}(f_{C_H} - f_{C_L}) \quad \text{[Equation 1]}$$

(where $f_{C_L}$ denotes a carrier frequency of a low-band signal in the DSL, $f_{C_H}$ denotes a carrier frequency of a high-band signal in the DSL, $f_{b_L}$ denotes a symbol rate of the low-band signal, and $f_{b_H}$ denotes a symbol rate of the high-band signal).

The bandwidth overlapping together with the use of imperfect wire shielding results in a crosstalk signal in the received signal. In FIG. 1, the region A shows the spectrum of the crosstalk signal formed by the partially overlapped received signals in the frequency domain.

Assume that the Tx signal is pulse-shaped by using a square-root raised cosine filter (SRCF) with a roll-off factor of α. Then, the spectrum of the crosstalk signal is located in the frequency range of Equation 2.

$$f_{C_H} - \frac{f_{b_H}}{2}(1+\alpha) \leq f \leq f_{C_L} + \frac{f_{b_L}}{2}(1+\alpha) \quad \text{[Equation 2]}$$

In order to measure the amount of the spectral overlapping, a carrier spacing ratio must be defined as given in Equation 3. The spacing ratio ζ represents frequency spacing between the center frequencies of the Tx and Rx signals normalized by the bandwidth of the Tx signal.

$$\zeta \equiv \frac{2(f_{C_H} - f_{C_L})}{(f_{b_L} + f_{b_H})(1+\alpha)} \quad \text{[Equation 3]}$$

When the spacing ratio is less than 1 (i.e., ζ<1.0), it implies that the two signals are overlapped in the frequency domain.

The Nyquist rate IDXC is used for crosstalk signal cancellation in data communications, and an interpolation ratio L of a polyphase structure is defined as given in Equation 4.

$$L \geq \begin{cases} \left\lceil \frac{2f_{C_H} + f_{b_H}(1+\alpha)}{f_{b_L}} \right\rceil; & \text{in the premises} \\ \left\lceil \frac{2f_{C_H} + f_{b_H}(1+\alpha)}{f_{b_H}} \right\rceil; & \text{in the central office} \end{cases} \quad \text{[Equation 4]}$$

Where ⌈x⌉ denotes the largest integer less than or equal to x.

When the crosstalk signal has a duration of N symbols and a conventional least mean square (LMS) adaptation algorithm is employed, each L-polyphase sub-canceller requires 4N MACs for filtering and adaptation of N complex-valued coefficients for each symbol duration. Herein, the MAC is a unit for one multiplication and accumulation.

Therefore, the L-polyphase sub-canceller requires a computational complexity of $8LNf_{b_L}$ MACs per second. As an example, assume that a symmetric DSL (SDSL) with a symbol rate of 256 Kbauds and ζ=0.83 is implemented. In this assumption, a conventional Nyquist rate IDXC requires a computational complexity of more than 640×106 MACs for a crosstalk signal with a span of 80 μs microseconds. However, it is difficult to implement such a sub-canceller that performs the computation by using a conventional digital signal processor.

SUMMARY OF THE INVENTION

The present invention has been made in an effort to provide a crosstalk signal cancellation method having the advantage of canceling a crosstalk signal generated due to overlapping of a transmit frequency bandwidth of a transmitter and a receive frequency bandwidth of a receiver in a mobile communication environment for data communication, and an apparatus using the same.

An exemplary apparatus according to one embodiment of the present invention cancels a crosstalk signal that is generated due to overlapping of a transmit frequency and a receive frequency in a mobile communication system. The apparatus includes a pre-processor, a crosstalk signal cancellation module, a post-processor, and an error feedback processor. The pre-processor frequency down-shifts an input signal having the crosstalk signal to a baseband. The crosstalk cancellation module cancels the crosstalk signal from the input signal by dividing the frequency down-shifted input signal by an interpolation ratio. The post-processor converts an output of the crosstalk signal cancellation module into a passband signal. The error feedback processor receives a residual crosstalk signal generated during a crosstalk signal cancellation process of the crosstalk signal cancellation module from the post-processor, performs a decimation operation, and feeds back a result of the decimation operation to the crosstalk signal cancellation module.

An exemplary method according to another embodiment of the present invention cancels a crosstalk signal that is generated due to overlapping of a transmit frequency and a receive frequency in a mobile communication system. The method includes: (a) frequency down-shifting an input signal having a crosstalk signal to a baseband; (b) converting the frequency down-shifted input signal by performing an interpolation operation; (c) filtering the interpolated signal and frequency-shifting to an original signal frequency; and (d) decimating a residual crosstalk signal generated during the interpolation and filtering processes, repeating from step (b).

DETAILED DESCRIPTION OF THE EMBODIMENTS

Figure 1:
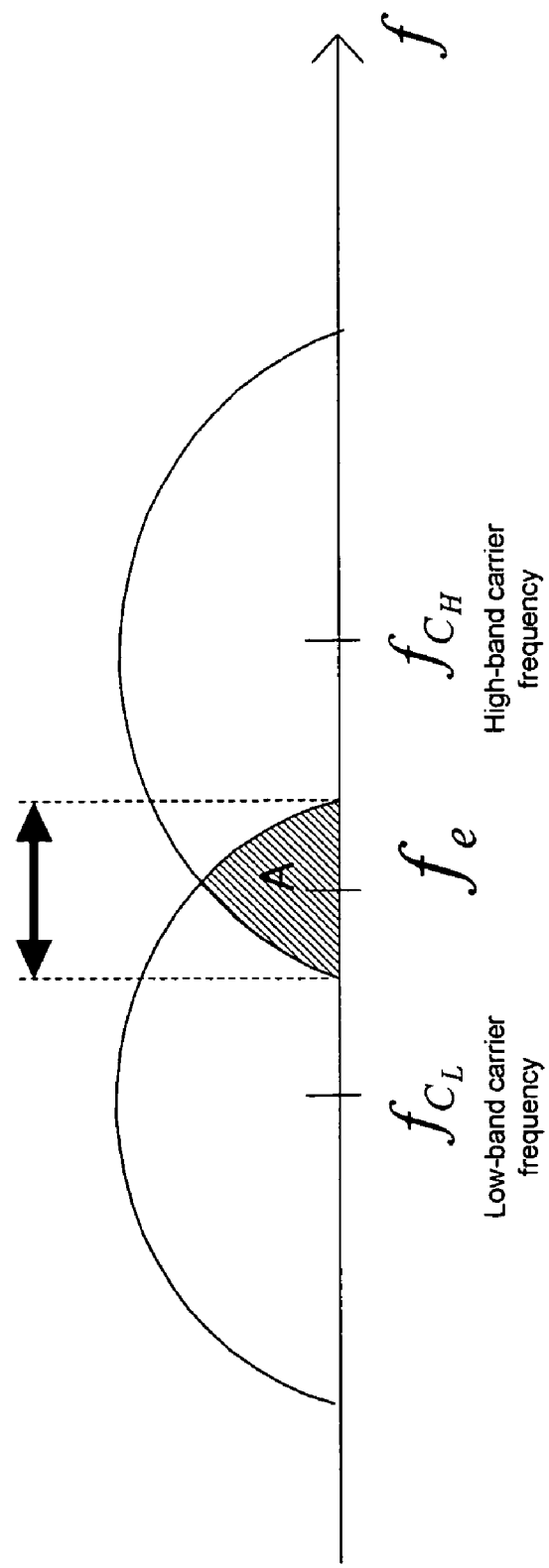
FIG. 1 shows the spectrum of a single-carrier crosstalk signal formed by the overlapped spectra of a transmit signal and a receive signal.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise" and variations such as "comprises" and "comprising" will be understood to imply the inclusion of stated elements but not the exclusion of any other elements.

Further, throughout this specification and the claims which follow, each block means a unit that performs a specific function or operation, and can be realized by hardware or software, or a combination of both As shown in FIG. 1, when a transmit signal and a receive signal are partially overlapped with each other in the frequency domain, the crosstalk signal is a passband signal when the overlapped bandwidth of the crosstalk signal is smaller than the bandwidth of the receive signal. Therefore, the crosstalk signal can be processed at a lower rate by frequency down-shifting to a baseband.

Figure 2:
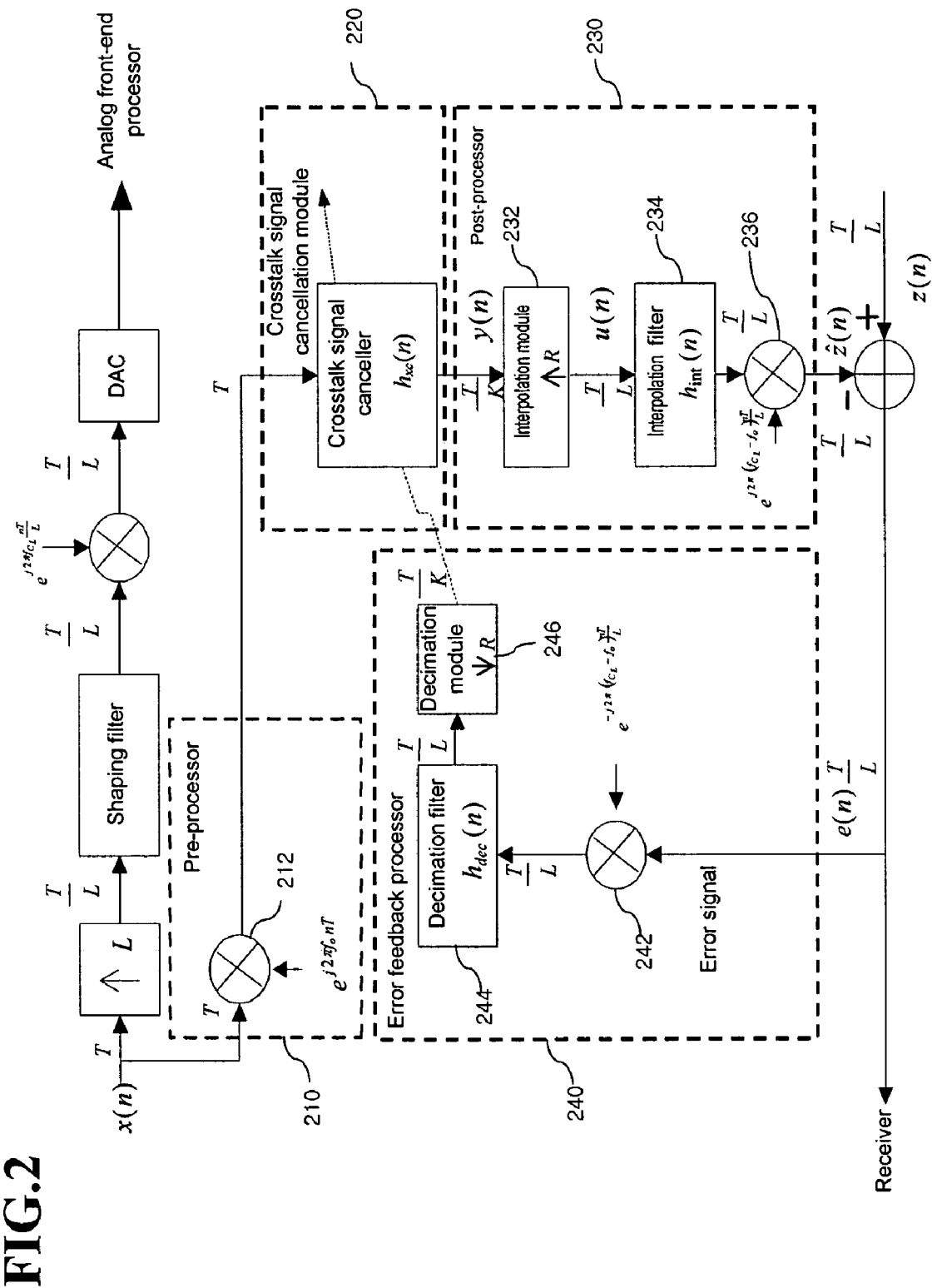
FIG. 2 is a block diagram of a crosstalk signal canceller according to an exemplary embodiment of the present invention.

FIG. 2 is a block diagram of a crosstalk canceller according to an exemplary embodiment of the present invention.

The crosstalk canceller (XC) includes a pre-processor 210, a crosstalk cancellation module 220, a post-processor 230, and an error feedback processor 240.

The pre-processor 210 frequency down-shifts an input signal of the XC to be equivalent to the baseband. Herein, the frequency down-shifting of the input signal to the baseband allows processing of the crosstalk signal at a lower rate, thereby reducing computational complexity for crosstalk cancellation. In this case, when the input signal x(n) is denoted as T, the pre-processor 210 frequency down-shifts T by an amount of $f_o$. The amount of $f_o$ can be represented as given in Equation 5.

$$f_O = \begin{cases} f_{C_L} - f_e; & \text{in the premises} \\ f_{C_H} - f_e; & \text{in the central office} \end{cases} \quad \text{[Equation 5]}$$

In addition, a multiplier 212 is used to multiply the input signal T by $e^{j2\pi f_o nT}$ so as to shift frequency. In this case, since the pre-processor 210 has only changed the bandwidth of the input signal, the input signal still can be denoted as T.

When receiving the frequency-shifted baseband-like crosstalk signal, the crosstalk cancellation module 220 processes the input signal at a rate lower than a conventional crosstalk signal canceller.

In this case, the input signal is divided by using an interpolation ratio for canceling the crosstalk signal. Herein, when the interpolation ratio is denoted as K, a signal passing through the crosstalk cancellation module 220 can be represented as $$\frac{T}{K}.$$

The crosstalk cancellation module 220 can be implemented in the form of a polyphase filter scheme.

The interpolation ratio K used for crosstalk cancellation by the crosstalk cancellation module 220 according to the exemplary embodiment of the present invention can be determined as given in Equation 6.

$$K = \lceil (1-\zeta)L \rceil \quad \text{[Equation 6]}$$

The computational speed according to the crosstalk cancellation can be reduced by a factor of R, which is defined as $$\frac{L}{K}.$$

The post-processor 230 converts an output of the crosstalk cancellation module 220 into a passband signal by performing interpolation using the factor R. An input signal y(n) of the post-processor 230 is denoted as $$\frac{T}{K},$$

and this is represented as $$\frac{T}{L}$$

by interpolation by an interpolation module 232 using the factor R. Herein, $$\frac{T}{L}$$

is an intermediate signal u(n) after the interpolation process.

The interpolated intermediate signal is filtered through an interpolation filter 234, and frequency-shifted by an amount of $(f_o - f_{C_L})$ by a multiplier 236.

In this case, the multiplier 236 multiplies an output of the interpolation filter 234, which is $$\frac{T}{L}, \text{ by } e^{j2\pi(f_{C_L} - f_o)\frac{nT}{L}}$$

to frequency-shift the filtered intermediate signal, and the frequency-shifted intermediate signal is output through the crosstalk canceller. In this case, the multiplier 236 has changed only the frequency bandwidth of the input signal, and so the output signal of the multiplier 236 can still be denoted as $$\frac{T}{L}.$$

The error feedback processor 240 includes a multiplier 242, a decimation filter 244, and a decimation module 246, and feeds back a residual crosstalk signal processed through the post-processor 230 to the crosstalk cancellation module 220.

The multiplier 242 frequency-shifts the residual crosstalk signal to a baseband equivalent one by multiplying the residual crosstalk signal by $$e^{-j2\pi(f_{C_L} - f_o)\frac{nT}{L}}$$

so as to transmit the frequency-shifted residual crosstalk signal to the crosstalk cancellation module 220.

In addition, the decimation filter 244 filters the frequency-shifted residual crosstalk signal.

The residual crosstalk signal input to the error feedback processor 240 is denoted as $$\frac{T}{L},$$

and is still denoted as $$\frac{T}{L}$$

after being processed by the multiplier 242 and the decimation filter 244.

The decimation module 246 performs a decimation operation on the residual crosstalk signal denoted as $$\frac{T}{L}$$

by using a factor R, denotes the decimation result as $$\frac{T}{K},$$

and transmits to the crosstalk canceller of the crosstalk cancellation module 220.

Herein, assume that the baseband equivalent impulse response of the crosstalk path and the crosstalk canceller are respectively denoted as $h_{xp}(n)$ and $h_{xc}(n)$, and the interpolation filter 234 is denoted as $h_{int}(n)$.

In this case, a crosstalk signal z(n) and an output ẑ(n) of the crosstalk canceller can be represented as given in Equation 7.

$$z(n) = [x(n) * h_{xp}(n)] e^{\frac{j2\pi f_{C_L} nT}{L}} + v(n) \qquad \text{[Equation 7]}$$
$$\hat{z}(n) = [u(n) * h_{int}(n)] e^{\frac{j2\pi (f_{C_L} - f_o) nT}{L}}$$

Where * denotes a convolution process, and v(n) denotes additive noise. Herein, the intermediate signal u(n) after the interpolation process can be represented as given in Equation 8.

$$u(n) = \begin{cases} y\left(\frac{n}{R}\right); n \text{ is intger times of } R \\ 0; n \text{ is not integer times of } R \end{cases} \qquad \text{[Equation 8]}$$

Where y(n) can be represented as given in Equation 9.

$$y(lK + m) = h_{xc}^{(m)}(l) * \left[ x(l) e^{j\frac{2\pi f_0 lT}{R}} \right].$$ [Equation 9]

Where $h_{xc}^{(m)}(l)$ denotes an impulse response of the m-th polyphase part of $h_{xc}(n)$, n=lK+m, and $0 \leq m \leq K-1$.

Assuming that the interpolation filter 234 and the decimation filter 244 of the XC use equi-ripple interpolation and decimation, it can be shown that the power of the residual crosstalk signal, output from the post-processor 230, can be approximated as given in Equation 10.

$$E\{|e(n)|^2\} = E\{|z(n) - \hat{z}(n)|^2\}$$ [Equation 10]
$$\approx \sigma_v^2 + \sigma_x^2 [\delta_p^2 + (R-1)\delta_s^2]$$

Where $\sigma_x^2$ denotes the power of the input signal x(n), $\sigma_v^2$ denotes the power of background noise v(n), $\delta_p$ denotes the maximum ripple magnitude of an equi-ripple filter in the passband, and $\delta_s$ denotes the maximum ripple magnitude of an equi-ripple filter in a stopband.

As described, the XC including the pre-processor 210, the crosstalk cancellation module 220, the post-processor 230, and the error feedback processor 240 repeats the input of the residual crosstalk signal to the crosstalk cancellation module 220 through the interpolation filter and the decimation filter, such that the XC performing crosstalk cancellation operation can be described in the baseband-equivalent band.

Figure 3:
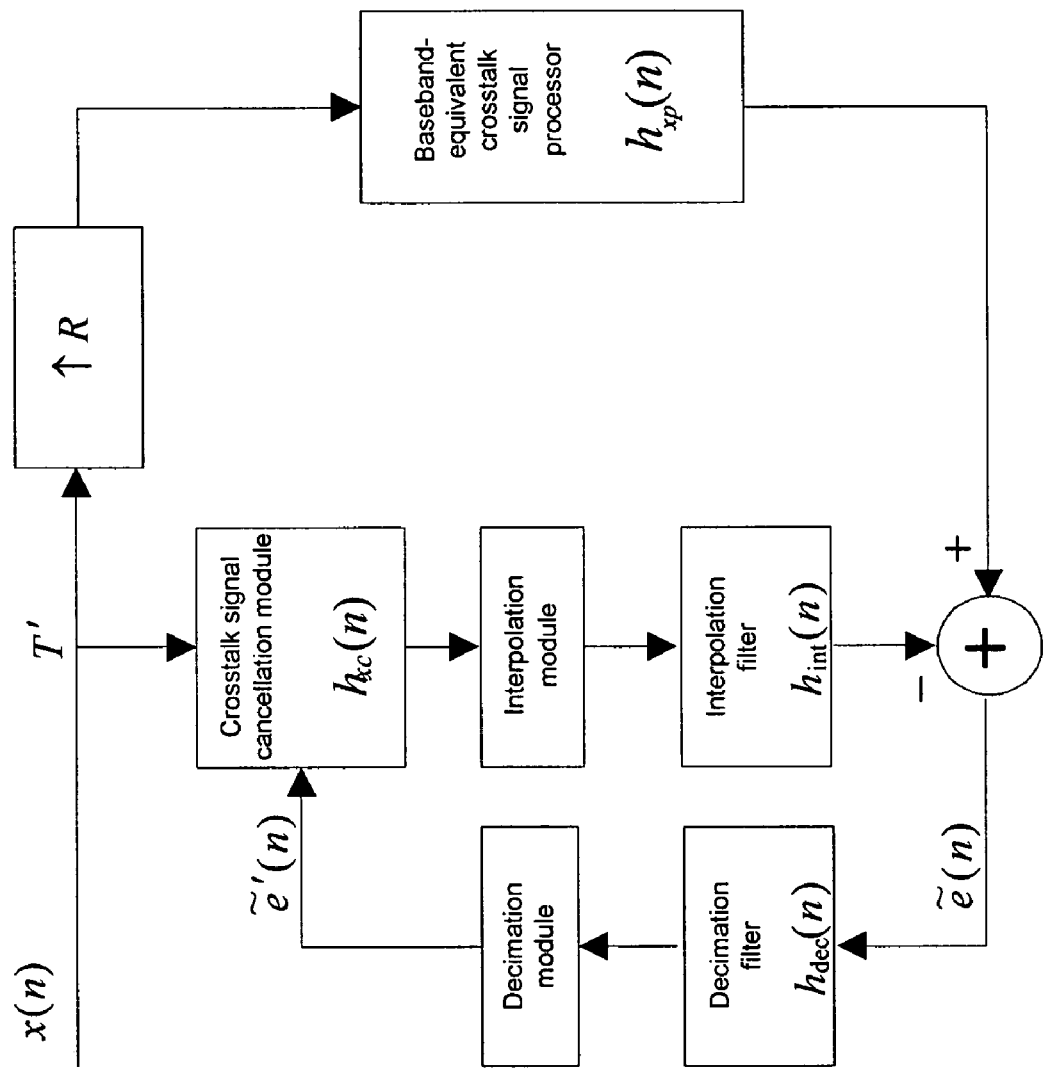
FIG. 3 is a block diagram of the crosstalk signal canceller with the use of a baseband signal.

FIG. 3 is a block diagram of the XC according to the exemplary embodiment of the present invention using a baseband signal.

The proposed XC can be depicted by a baseband-equivalent one as shown in FIG. 3, where T' is an input signal T and $\tilde{e}(n)$ is a residual crosstalk signal e(n). In this case, $$T' = \frac{T}{K}$$

and the residual crosstalk signal $\tilde{e}(n)$ can be represented as given in Equation 11.

$$\tilde{e}(n) = e(n) e^{j\frac{2\pi(f_0 - f_{C_L})nT}{L}}$$ [Equation 11]

Where $\tilde{e}(n)$ can be represented as given in Equation 12 in the frequency domain.

$$\tilde{E}(j\omega) = \Im\{\tilde{e}(n)\}$$ [Equation 12]
$$= X(j\omega R)[H_{xp}(j\omega) - H_{xc}(j\omega R)H_{int}(j\omega)]$$

Where $\Im\{x\}$ denotes a Fourier transform of x. Accordingly, $X(j\omega)$ denotes a Fourier transform of the input signal x(n), $H_{xp}(j\omega)$ denotes a Fourier transform of a baseband equivalent crosstalk path $h_{xp}(n)$, $H_{xc}(j\omega)$ denotes a Fourier transform of the crosstalk canceller $h_{xc}(n)$, and $H_{int}(j\omega)$ denotes a Fourier transform of the interpolation filter $h_{int}(n)$.

In this case, the error signal $\tilde{e}'(n)$ for updating the crosstalk canceller can be obtained by decimating $\tilde{e}(n)$ by using the factor R. The error signal $\tilde{e}'(n)$ can be represented as given in Equation 13 in the frequency domain.

$$\tilde{E}'(j\omega) = \frac{1}{R}\sum_{k=0}^{R-1} \tilde{E}\left(j\frac{\omega - 2\pi k}{R}\right) H_{dec}\left(j\frac{\omega - 2\pi k}{R}\right)$$ [Equation 13]

$$= \frac{1}{R}\sum_{k=0}^{R-1} X\left(j\frac{\omega - 2\pi k}{R} \cdot R\right) H_{dec}\left(j\frac{\omega - 2\pi k}{R}\right)$$

$$\left[ H_{xp}\left(j\frac{\omega - 2\pi k}{R}\right) - H_{xc}\left(j\frac{\omega - 2\pi k}{R} \cdot R\right) H_{int}\left(j\frac{\omega - 2\pi k}{R}\right) \right]$$

$$= X(j\omega) \left[ \frac{1}{R}\sum_{k=0}^{R-1} H_{dec}\left(j\frac{\omega - 2\pi k}{R}\right) H_{xp}\left(j\frac{\omega - 2\pi k}{R}\right) - \frac{H_{xc}(j\omega)}{R} \sum_{k=0}^{R-1} H_{int}\left(j\frac{\omega - 2\pi k}{R}\right) H_{dec}\left(j\frac{\omega - 2\pi k}{R}\right) \right]$$

Where $H_{dec}(j\omega)$ is a Fourier transform of the decimation filter $h_{dec}(n)$.

Because the error signal $\tilde{e}'(n)$ can only be extracted from $\tilde{e}(n)$ using the decimation $h_{dec}(n)$, the use of a conventional least mean square (LMS) adaptive algorithm may not provide reliable convergence performance. This problem can be alleviated using a filtered-X algorithm. The filtered-X algorithm has widely been applied to artificial cardiac operations as auxiliary pre-processor and post-processor filters.

A first auxiliary filter $h_{aux}(n)$ and the modified crosstalk path $h_{xp}'(n)$ can be defined as given in Equation 14 in the frequency domain.

$$H_{aux}(j\omega) \equiv \frac{1}{R}\sum_{k=0}^{R-1} H_{int}\left(j\frac{\omega - 2\pi k}{R}\right) H_{dec}\left(j\frac{\omega - 2\pi k}{R}\right)$$ [Equation 14]

$$H_{xp}'(j\omega) \equiv \frac{1}{R}\sum_{k=0}^{R-1} H_{dec}\left(j\frac{\omega - 2\pi k}{R}\right) H_{xp}\left(j\frac{\omega - 2\pi k}{R}\right)$$

Herein, the modifier input signal x'(n) for adaptation of the filtered-X LMS algorithm can be obtained by Equation 15.

$$x'(n) = \sum_{i=0}^{N_{aux}-1} h_{aux}(i) x(n-i)$$ [Equation 15]

Where $N_{aux}$ denotes the tap size of $h_{aux}(n)$. Assuming that the inverse of $h_{aux}(n)$ is $h_{aux}^{-1}(n)$, a crosstalk canceller with adaptation of the filtered-X algorithm can be implemented.

Figure 4:
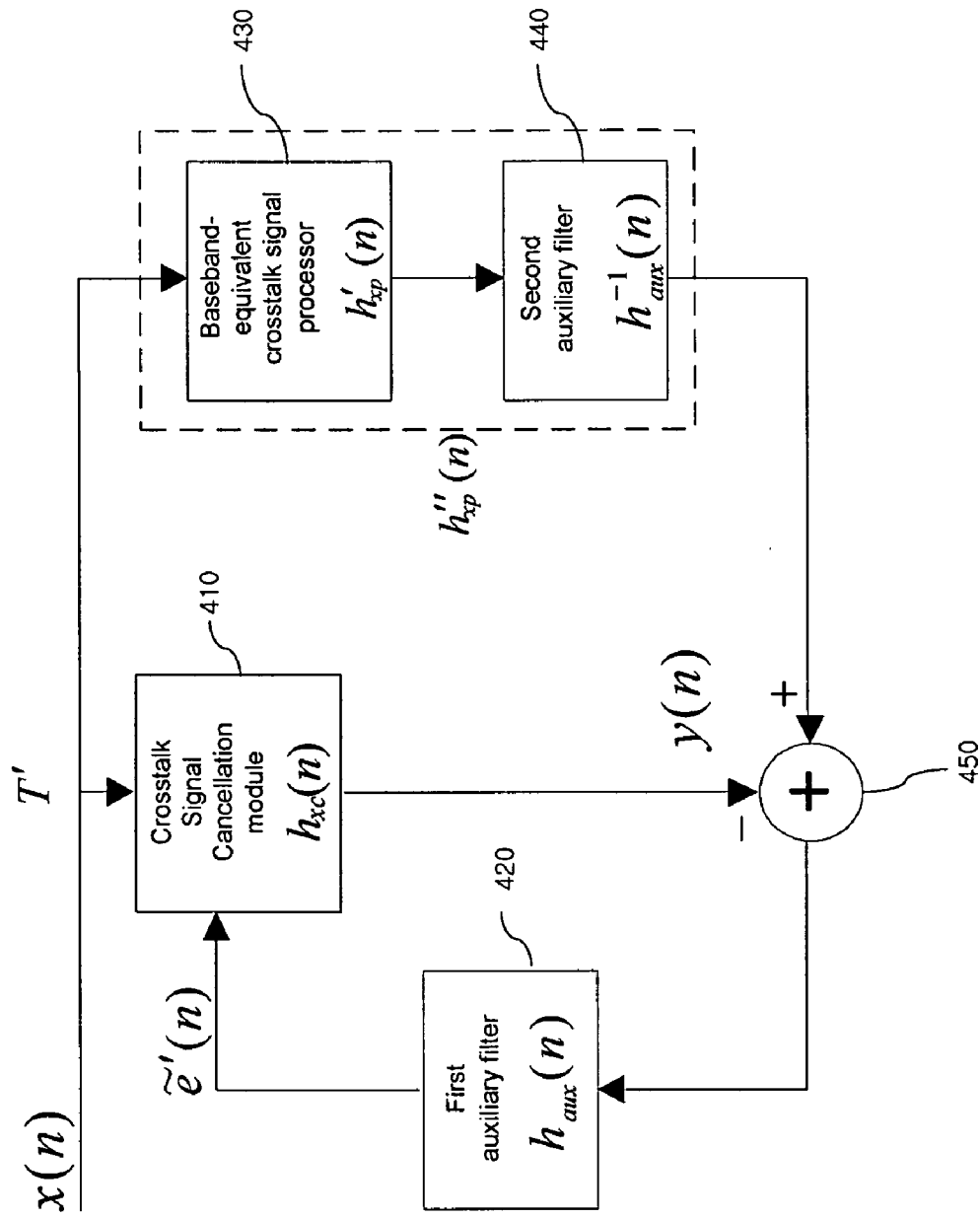
FIG. 4 is a block diagram of a crosstalk signal canceller with the application of a filtered-X algorithm according to another exemplary embodiment of the present invention.

FIG. 4 is a block diagram of a crosstalk canceller with adaptation of the filtered-X algorithm according to another exemplary embodiment of the present invention.

The filtered-X algorithm-adapted crosstalk canceller includes a crosstalk canceller 410, a first auxiliary filter 420, a baseband equivalent crosstalk processor 430, a second auxiliary filter 440, and an adder 450.

When the baseband equivalent crosstalk processor 430 is denoted as $h_{xp}'(n)$, and the second auxiliary filter 440 is denoted as $h_{aux}^{-1}(n)$, the overall baseband crosstalk process $h_{xp}''(n)$ becomes $h_{xp}''(n)=h_{xp}'(n)*h_{aux}^{-1}(n)$.

The crosstalk canceller 410 receives x'(n) and cancels the crosstalk signal from the input signal at a low speed. In this case, a coefficient of the crosstalk canceller 410 can be calculated by Equation 16.

$$h_{xc}(n+1)=h_{xc}(n)+\mu x'(n)\tilde{e}'(n) \qquad \text{[Equation 16]}$$

Where $x'(n)=[x'(n)\, x'(n-1)\, x'(n-2)\ldots x'(n-N+1)]^T$. When a tap error vector at time n is defined as $\epsilon(n)$, $\epsilon(n)$ can be calculated by Equation 17.

$$\varepsilon(n) = h_{xc}(n) - h_{xp}''(n) \qquad \text{[Equation 17]}$$

$$\varepsilon(n+1) = \varepsilon(n) -$$

$$\mu \sum_{i=0}^{N_{aux}-1} \sum_{j=0}^{N_{aux}-1} h_{aux}(i)h_{aux}(j)x(n-j)x^T(n-i)\varepsilon(n-i) +$$

$$\mu \sum_{i=0}^{N_{aux}-1} \sum_{j=0}^{N_{aux}-1} h_{aux}(i)h_{aux}(j)x(n-j)v(n-i)$$

Assuming that the input signal is random-processed, Equation 17 can be represented as given in Equation 18.

$$E\{\varepsilon(n+1)\} = E\{\varepsilon(n)\} - \mu\sigma_x^2 I_N \sum_{i=0}^{N_{aux}-1} h_{aux}^2(i)E\{\varepsilon(n-i)\} \qquad \text{[Equation 18]}$$

Where $I_N$ denotes an (N×N)-dimensional identifier matrix. For each element of $E\{\epsilon(n)\}$, the characteristic equation is given by Equation 19.

$$z - 1 + \mu\sigma_x^2 \sum_{i=0}^{N_{aux}-1} h_{aux}^2(i)z^{-i} = 0 \qquad \text{[Equation 19]}$$

In this case, an adaptation parameter $\mu$ should be determined such that the roots of the characteristic equation of Equation 19 are inside a unit circuit to guarantee stability.

Assuming that a covariance matrix according to the characteristic equation is $R_\epsilon^{(i,j)}(n)$, the covariance matrix can be defined as given in Equation 20.

$$R_\epsilon^{(i,j)}(n)=E\{\epsilon(n-i)\epsilon^T(n-j)\} \qquad \text{[Equation 20]}$$

The covariance matrix obtained by Equation 20 can be represented as given in Equation 21.

$$R_\varepsilon^{(0,0)}(n+1) = R_\varepsilon^{(0,0)}(n) - \qquad \text{[Equation 21]}$$

$$\mu\sigma_x^2 \sum_{i=0}^{N_{aux}-1} h_{aux}^2(i)R_\varepsilon^{(i,0)}(n) - \mu\sigma_x^2 \sum_{k=0}^{N_{aux}-1} h_{aux}^2(k)R_\varepsilon^{(0,k)}(n) -$$

$$\mu^2 \sum_{i=0}^{N_{aux}-1} \sum_{j=0}^{N_{aux}-1} \sum_{k=0}^{N_{aux}-1} \sum_{l=0}^{N_{aux}-1} h_{aux}(i)$$

$$h_{aux}(j)h_{aux}(k)h_{aux}(l) \cdot E$$

$$\{x(n-j)x^T(n-i)R_\varepsilon^{(i,\prime)}(n)x(n-l)x^T(n-k)\} +$$

-continued $$\mu^2\sigma_x^2\sigma_v^2 I_N \sum_{i=0}^{N_{aux}-1} \sum_{j=0}^{N_{aux}-1} h_{aux}^2(i)h_{aux}^2(j).$$

Accordingly, residual crosstalk power can be represented as given in Equation 22.

$$E\{|e(n)|^2\}=\sigma_v^2+\text{trace}\{R_\epsilon^{(0,0)}(n)\}\sigma_x^2 \qquad \text{[Equation 22]}$$

Through the above-described equations, a crosstalk signal of a baseband signal can be cancelled by using the crosstalk canceller with application of the filtered-X algorithm.

Figure 5:
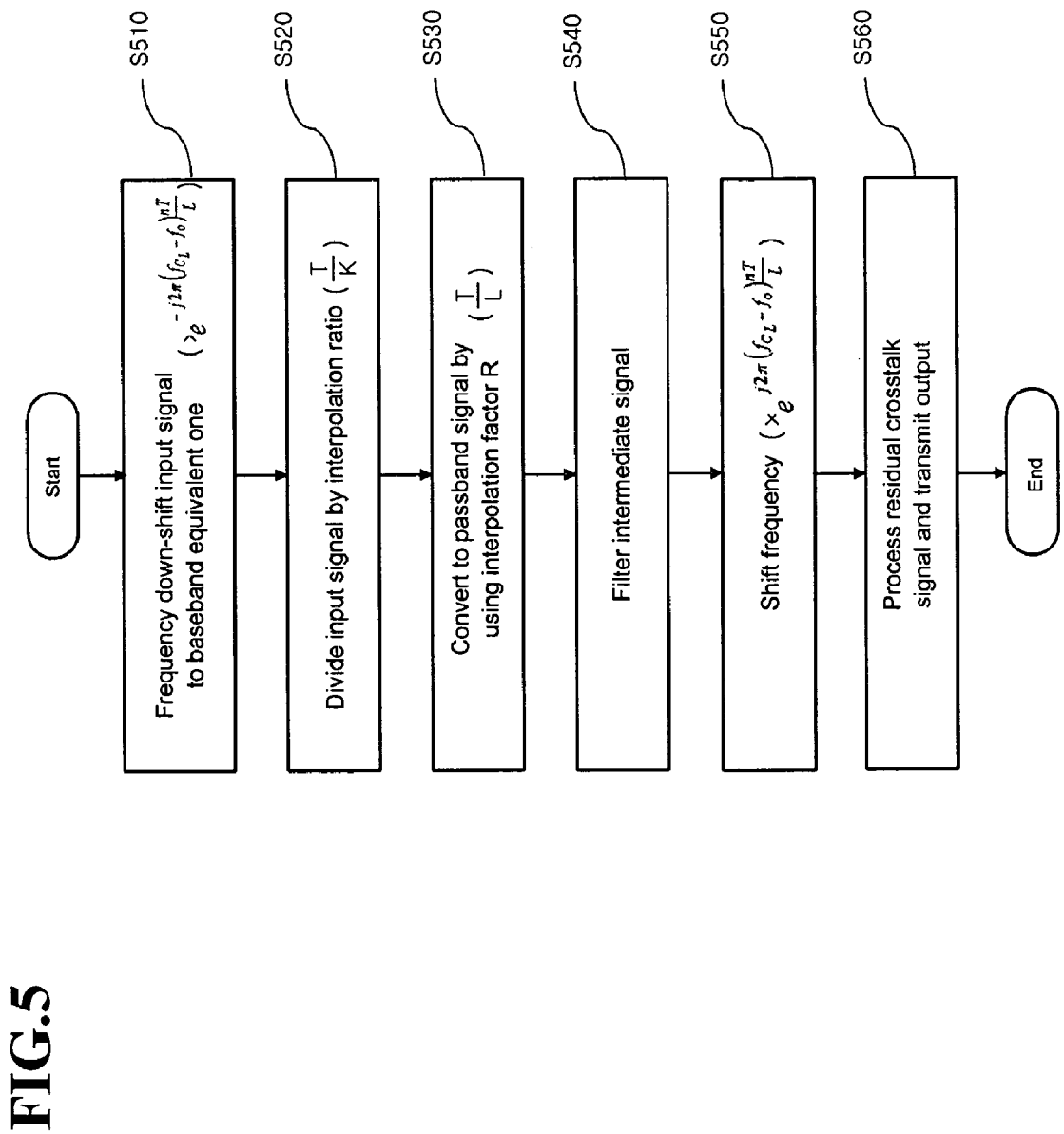
FIG. 5 is a flowchart of a process for canceling a partially overlapped single-carrier crosstalk signal according to the exemplary embodiment of the present invention.

FIG. 5 is a flowchart of a process for cancellation of a partially overlapped single-carrier crosstalk signal according to the exemplary embodiment of the present invention.

When a signal is input to a crosstalk canceller, the input signal T is frequency down-shifted to a baseband by using the pre-processor 210 so as to process a crosstalk signal at a lower rate, thereby reducing computational complexity. In this case, the input signal can be frequency down-shifted by multiplying the input signal by $$e^{-j2\pi(f_{C_L}-f_0)\frac{nT}{L}}$$

in step S510.

The frequency down-shifted input signal is divided by the interpolation ratio by using the crosstalk canceller implemented in the form of the polyphase filter scheme, in step S520.

Then, an interpolation operation is performed so as to convert the crosstalk signal into a passband signal. In this case, the interpolation operation is performed by using a factor R as an interpolation factor, in step S530. The factor R is obtained by dividing an interpolation ratio L of a polyphase structure by an interpolation ratio K used for crosstalk signal cancellation.

An output signal of the interpolation operation of step S530 is filtered by using the interpolation filter 234 in step S540, and a filtered intermediate signal is frequency-shifted to an original signal frequency by using the multiplier. For this purpose, an inverse value $$e^{j2\pi(f_{C_L}-f_0)\frac{nT}{L}}$$

of the value multiplied in step S510 is multiplied in step S550.

Subsequently, the interpolated and filtered signal is output as an output of the crosstalk canceller. In addition, a residual crosstalk signal generated during the above-described crosstalk signal cancellation process is decimated by the error feedback processor 240 so that the crosstalk signal cancellation process is repeated in step S560.

Figure 6:
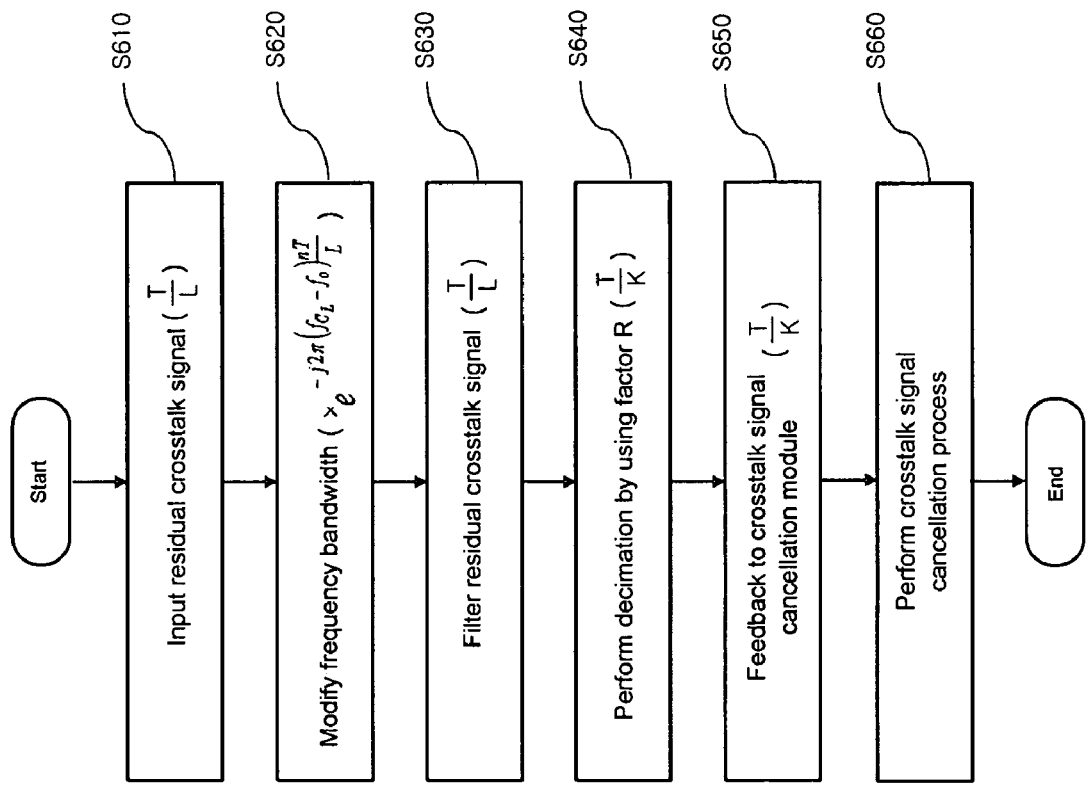
FIG. 6 is a flowchart of a feedback process for a residual crosstalk signal generated during the single-carrier crosstalk signal cancellation process according to the exemplary embodiment of the present invention.

FIG. 6 is a flowchart of a process for feedback of a residual crosstalk signal generated during the single-carrier crosstalk signal cancellation process according to the exemplary embodiment of the present invention.

When receiving the residual crosstalk signal generated during the crosstalk cancellation process in step S610, the error feedback processor 240 frequency-shifts it to a baseband equivalent signal by multiplying a frequency-shifted intermediate signal by $$e^{-j2\pi(f_{C_L}-f_o)\frac{\pi T}{L}}$$

in step S620. Herein, the frequency-shifted intermediate signal has been frequency-shifted to the original signal frequency.

The baseband equivalent residual crosstalk signal is filtered by the decimation filter 244 in step S630, and decimated by the decimation module 246 by using the factor R in step S640.

The decimated residual crosstalk signal is fed back to the crosstalk cancellation module 220 in step S650, and the crosstalk cancellation module 220 and the post-processor 230 perform the crosstalk signal cancellation process. That is, the steps from step S520 in FIG. 5 are repeated, and when a residual crosstalk signal is generated again during the crosstalk signal cancellation process, the steps from step S610 are repeated after the step of S560, in step S660.

As described, a crosstalk signal between the transmit frequency bandwidth and the receive frequency bandwidth can be cancelled with the use of the interpolation and decimation processes in the crosstalk signal cancellation process and the residual crosstalk signal feedback process.

The above-described exemplary embodiments of the present invention can be realized not only through a method and an apparatus, but also through a program that can perform functions corresponding to configurations of the exemplary embodiments of the present invention or a recording medium storing the program, and this can be easily realized by a person skilled in the art.

According to the exemplary embodiments of present invention, when the overlapped bandwidth of the crosstalk signal is smaller than the bandwidth of the transmit signal, the crosstalk signal can be processed in a baseband such that computational complexity in the crosstalk signal cancellation process can be reduced without using high sampling frequency.

In addition, by using the interpolation and decimation filters, complexity in implementation of the crosstalk signal canceller can be reduced and the crosstalk signal can be processed at a lower rate, thereby reducing computational complexity.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for canceling a crosstalk signal that is generated due to overlapping of a transmit frequency and a receive frequency in a mobile communication system, the apparatus comprising:
   a pre-processor for frequency down-shifting an input signal having the crosstalk signal to a baseband;
   a crosstalk signal cancellation module for canceling the crosstalk signal from the input signal by dividing the frequency down-shifted input signal by an interpolation ratio;
   a post-processor for converting an output of the crosstalk signal cancellation module into a passband signal; and
   an error feedback processor for receiving a residual crosstalk signal generated during a crosstalk signal cancellation process of the crosstalk signal cancellation module from the post-processor, performing a decimation operation, and feeding a result of the decimation operation back to the crosstalk signal cancellation module.

2. The apparatus of claim 1, wherein the post-processor comprises:
   an interpolation module for receiving an output of the crosstalk signal cancellation module and performing an interpolation operation on the output;
   an interpolation filter for filtering the interpolated signal; and
   a multiplier for converting the filtered intermediate signal into the passband signal.

3. The apparatus of claim 2, wherein the interpolation module uses a value R as a factor for the interpolation operation, the value R being obtained by dividing a polyphase interpolation ratio L by an interpolation ratio K that is used for crosstalk signal cancellation.

4. The apparatus of claim 1, wherein the error feedback processor comprises:
   a multiplier for frequency-shifting the residual crosstalk signal to a baseband equivalent band;
   a decimation filter for performing a filtering operation to decimate the frequency-shifted residual crosstalk signal received from the multiplier; and
   a decimation module for decimating the residual crosstalk signal filtered by the decimation filter and transmitting a decimation result to the crosstalk signal cancellation module.

5. The apparatus of claim 1, wherein the apparatus uses a filtered-X algorithm comprising:
   a first auxiliary filter for filtering a signal interpolated by the post-processor and filtering a signal decimated by the error feedback processor;
   a baseband crosstalk signal processor for processing a baseband-equivalent crosstalk signal; and
   a second auxiliary filter for filtering the crosstalk signal processed by the baseband crosstalk signal processor.

6. The apparatus of claim 5, wherein the second auxiliary filter has an inverse relationship with the first auxiliary filter.

7. A method for canceling a crosstalk signal that is generated due to overlapping of a transmit frequency and a receive frequency in a mobile communication system, the method comprising:
   (a) frequency down-shifting an input signal having a crosstalk signal to a baseband;
   (b) converting the frequency down-shifted input signal into a passband signal by performing an interpolation operation;
   (c) filtering the interpolated signal and frequency-shifting to an original signal frequency; and
   (d) decimating a residual crosstalk signal generated during the interpolation and filtering processes, and repeating from step (b).

8. The method of claim 7, wherein (d) comprises:
   (d1) frequency down-shifting the residual crosstalk signal to a baseband;
   (d2) filtering the frequency-shifted residual crosstalk signal by using a decimation filter;
   (d3) decimating the filtered residual crosstalk signal; and
   (d4) repeating from step (b).

9. The method of claim 8, wherein, in (d1), the residual crosstalk signal is frequency down-shifted by an amount of $f_o$ by multiplying the residual crosstalk signal by $$e^{-j2\pi(f_{C_L}-f_o)\frac{\pi T}{L}}.$$

10. The method of claim 8, wherein, in (d3), the decimation operation is performed by using a value (R) as a factor, the value (R) being obtained by dividing an interpolation ratio (L) of a polyphase structure by an interpolation ratio (K) that is used for crosstalk signal cancellation.

11. The method of claim 7, wherein, in (a), the input signal is frequency down-shifted by an amount of $f_o$ by multiplying the input signal by $$e^{-j2\pi(f_{C_L}-f_o)\frac{\pi T}{L}},$$

where $$f_o = \begin{cases} f_{C_L} - f_e; & \text{in the premises} \\ f_{C_H} - f_e; & \text{in the central office} \end{cases}, \text{ and herein}$$

$f_{C_L}$ denotes a carrier frequency of a low-band signal, and $f_{C_H}$ denote a carrier frequency of a high-band signal.

12. The method of claim 7, wherein, in (c), the filtered interpolation signal is multiplied by $$e^{j2\pi(f_{C_L}-f_o)\frac{\pi T}{L}}$$

so as to frequency-shift to an original signal frequency.

13. The method of claim 7, wherein, in (b), the interpolation operation is performed by using a value (R) as a factor, the value (R) being obtained by dividing an interpolation ratio (L) of a polyphase structure by an interpolation ratio (K) that is used for crosstalk signal cancellation.

14. The method of claim 7, wherein the method comprises:
   filtering the interpolated signal and the decimated signal by using a filtered-X algorithm including a pre-processing filter and a post-processing filter; and
   filtering the crosstalk signal by using the filtered-X algorithm.

\* \* \* \* \*